J. E. DAVIS.
WHEEL FASTENER.
APPLICATION FILED MAY 2, 1910.
982,413.
Patented Jan. 24, 1911.
2 SHEETS—SHEET 1.
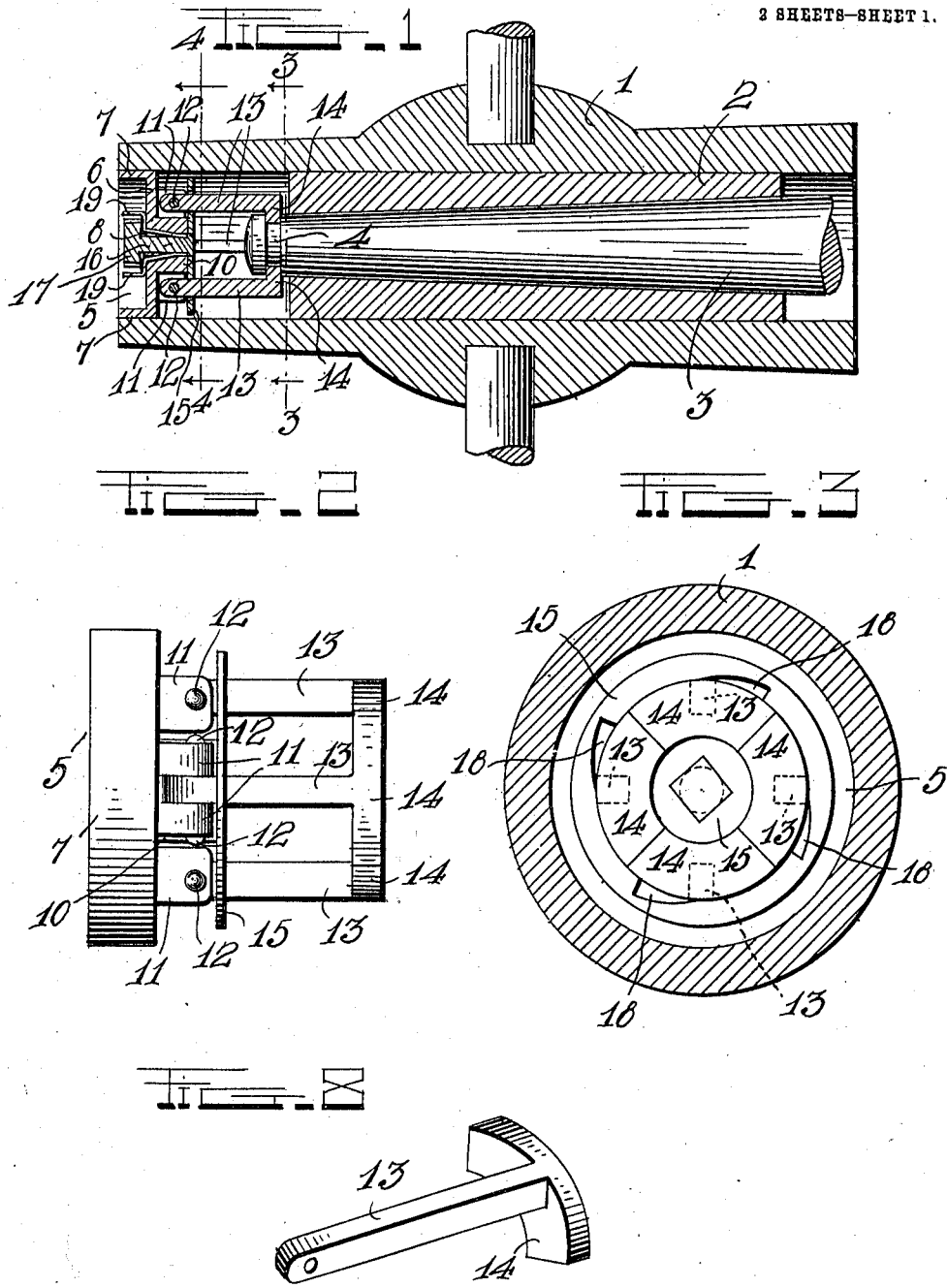
Witnesses
A. P. Hardy
C. H. Griesbauer
Inventor
J. E. Davis
by H. B. Willson & Co.
Attorneys J. E. DAVIS.
WHEEL FASTENER.
APPLICATION FILED MAY 2, 1910.
982,413.
Patented Jan. 24, 1911.
2 SHEETS—SHEET 2.
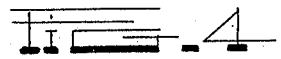
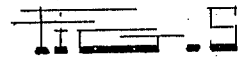
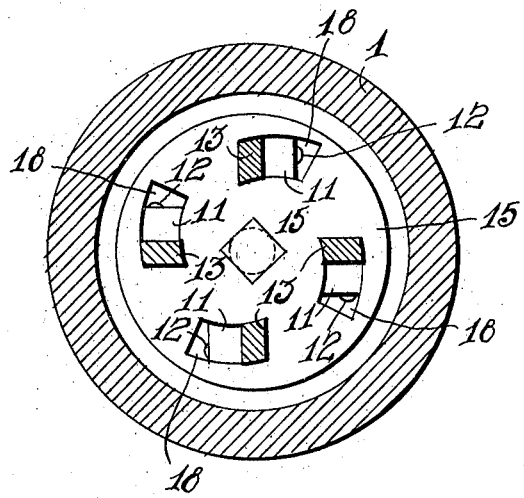
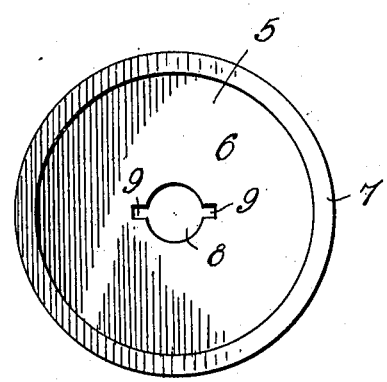
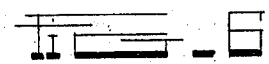
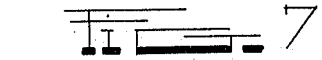
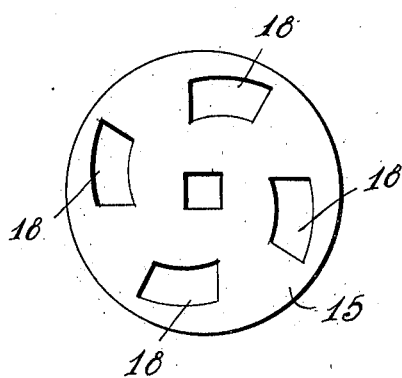
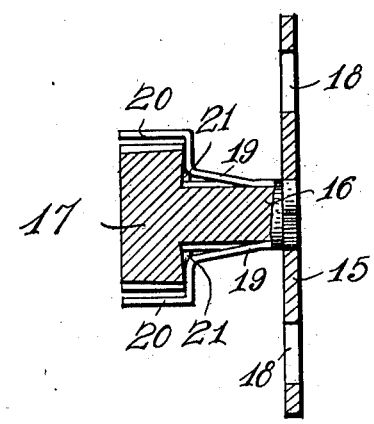
Witnesses
C. P. Hardy
C. H. Griesbauer
Inventor
J. E. Davis
by H. B. Willson & Co.
Attorneys

UNITED STATES PATENT OFFICE.

JOHN E. DAVIS, OF EAST BEND, NORTH CAROLINA.

WHEEL-FASTENER.

982,413. Specification of Letters Patent. Patented Jan. 24, 1911.

Application filed May 2, 1910. Serial No. 558,963.

*To all whom it may concern:*

Be it known that I, JOHN E. DAVIS, a citizen of the United States, residing at East Bend, in the county of Yadkin and State of North Carolina, have invented certain new and useful Improvements in Wheel-Fasteners; and I do declare the following to be a full, clear, and exact description of the invention, such as will enable others skilled in the art to which it appertains to make and use the same.

This invention relates to improvements in wheel fasteners.

One object of the invention is to provide a simple and improved fastening device for securing a wheel to an axle spindle thereby dispensing with the use of nuts or similar fastening devices.

With this and other objects in view, the invention consists of certain novel features of construction, combination and arrangement of parts as will be more fuly described and particularly pointed out in the appended claims.

In the accompanying drawings: Figure 1 is a central longitudinal sectional view of a wheel hub and spindle showing the application of the invention thereto; Fig. 2 is side view of a fastening device removed from the hub; Fig. 3 is a cross sectional view on the line 3—3 of Fig. 1; Fig. 4 is a similar view on the line 4—4 of Fig. 1; Fig. 5 is an enlarged end view of the cap which secures the device in the hub of the wheel; Fig. 6 is an enlarged end view of the inner end of the operating mechanism for the spindle gripping fingers; Fig. 7 is an enlarged central longitudinal sectional view of the same; and, Fig. 8 is a detail perspective view of one of the spindle gripping fingers.

Referring more particularly to the drawings 1 denotes the hub of a vehicle wheel, 2 denotes the box arranged in said hub and 3 denotes the axle spindle. In the outer end of the axle 3 is formed an annular groove or channel 4 with which is adapted to be engaged my improved hub or wheel fastening device.

My improved fastening device comprises a retaining cap 5 comprising a circular plate 6 having on its outer edge an annular flange 7 which is adapted to fit within the outer end of the hub and to be secured in said end in any suitable manner. In the plate 6 is formed a centrally disposed circular aperture 8 and oppositely disposed notches 9 which communicate with the aperture 8 and are provided for a purpose hereinafter described.

On the inner side of the plate 6 is formed a centrally disposed boss 10 and a series of lugs 11 said lugs being arranged in pairs and said pairs arranged at diametrically opposite positions around the boss 10 as shown. The lugs 11 are provided with alined bearing apertures to receive bearing pins 12 on which and between the lugs are pivotally secured the inner ends of spindle gripping fingers 13 on the outer ends of which are formed segmental spindle engaging plates 14 which are adapted to be brought into engagement with the groove or channel 4 in the end of the spindle thereby revolubly securing the hub thereon.

The fingers 13 are operated to engage the plates 14 with the groove 4 and to disengage the same therefrom by means of a finger operating mechanism which is here shown and preferably consists of a plate or disk 15 arranged at the inner end of the boss 10 and rigidly secured to the inner end of an operating stem 16 which projects through the boss and through the aperture 8 in the plate 6 of the retaining cap. The stem 16 is provided on its outer end with an operating head 17 whereby the same and said disk 15 is turned in one direction or the other. In the plate 15 is formed a series of cam slots 18 which are engaged with the fingers 13 whereby when said disk is turned in one direction the fingers will be retracted and the plate 14 thereof engaged with the groove 4 in the spindle and when said disk is turned in the opposite direction said fingers will be extended and the plates thereof thus disengaged from the groove 4 thereby releasing the hub and permitting the same to be removed from the spindle. In order to lock the fingers in a retracted position and the plates thereon into engagement with the groove 4 to fasten the hub on the spindle I provide a suitable locking mechanism which is here shown and is preferably in the form of two spring catches 19 the inner ends of which are secured to the opposite sides of the shank 16. The spring catches 19 project through the notches 9 in the plate 6 and have their outer ends offset to form gripping devices or handles 20 which when pressed inwardly engage notches 21 formed in the opposite sides of the head 17 and thus retract the catches 19 from engagement with the notches 9 in the plate 6 thus permitting the shank 16 and the disk 15 to be turned by the head 17 thus actuating the fingers 13 for the purpose of engaging or releasing the plates 14 with or from the groove 4 in the spindle. The spring catches 19 are arranged on the stem 16 in such positions with respect to the notches 9 in the plates 6 that when the fingers are in a retracted position to engage the plates 14 with the groove 4 said catches will be opposite to the notches 9 so that when released said catches will spring into the notches and thereby lock the spindle 16 and disk 15 in position to hold the fingers in retracted position and the plates thereon in operative engagement with the groove in the spindle.

From the foregoing description taken in connection with the accompanying drawings, the construction and operation of the invention will be readily understood without requiring a more extended explanation.

Various changes in the form, proportion and the minor details of construction may be resorted to without departing from the principle or sacrificing any of the advantages of this invention as defined in the appended claims.

Having thus described the invention what I claim is:

1. In a device of the character described, a wheel hub, an axle spindle adapted to receive said hub, said spindle having an annular groove formed therein, a retaining cap in the outer end of said hub having a central opening and oppositely disposed notches communicating with said opening, a shank extending through the opening of the cap and rotatable therein, a disk formed on the inner end of said shank and provided with a plurality of cam slots, a plurality of fingers extending through said slots at their outer ends and pivoted to said cap, the inner ends of said fingers being engaged and disengaged with the annular groove of said spindle upon the rotation of said shank; and oppositely disposed resilient locking devices on said shank adapted to engage in the notches in said cap to lock the fingers in engagement with said spindle.

2. In a device of the character described, a wheel hub, an axle spindle adapted to receive said hub, said spindle having an annular groove formed therein, a retaining cap in the outer end of said hub comprising a plate having an annular flange on its outer edge, a boss centrally formed on said plate extending oppositely to said flange, said boss and plate having a central opening therein, a shank rotatably disposed in said opening, said plate having notches communicating with the opening, a disk formed on the inner end of said shank formed with a plurality of cam slots, an operating head on the outer end of said shank, fingers each having a segmental plate formed on its inner end for engagement in the groove of said spindle, the outer ends of said fingers extending through the slots in said disk, spaced lugs formed on the retaining cap, said fingers being pivotally secured between said lugs and resilient locking plates secured at one end to said shank adapted to engage in the notches in said rectangular cap to lock the fingers against movement and retain the segmental plates in the groove of the spindle, said shank and operating head being provided with grooves to receive the spring plates when disengaged from the notches to permit the rotation of said disk and the disengagement of said plates with the axle spindle.

In testimony whereof I have hereunto set my hand in presence of two subscribing witnesses.

JOHN E. DAVIS.

Witnesses:
R. B. MARTIN,
J. V. DAVIS.